(12) United States Patent
Mangum

(10) Patent No.: US 6,581,963 B2
(45) Date of Patent: *Jun. 24, 2003

(54) CATALYTIC FILTER FOR AN INFLATOR

(75) Inventor: Michael G. Mangum, Mesa, AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/918,112

(22) Filed: Jul. 30, 2001

(65) Prior Publication Data

US 2003/0025311 A1 Feb. 6, 2003

Related U.S. Application Data

(62) Division of application No. 09/911,202, filed on Jul. 23, 2001, now Pat. No. 6,481,747.

(51) Int. Cl.[7] .................. B60R 21/26; B01D 53/56; B01D 53/62; B01D 53/86
(52) U.S. Cl. ...................... 280/741; 422/180
(58) Field of Search .................. 280/741, 736, 280/740, 742; 422/171, 177, 180

(56) References Cited

U.S. PATENT DOCUMENTS

| | | |
|---|---|---|
| 3,797,854 A | 3/1974 | Poole et al. |
| 5,100,171 A | 3/1992 | Faigle et al. |
| 5,204,068 A | 4/1993 | O'Loughlin et al. |
| 5,275,433 A * | 1/1994 | Klober et al. ............... 280/741 |
| 5,401,566 A | 3/1995 | Magee et al. |
| 5,741,468 A | 4/1998 | Saito et al. |
| 5,795,553 A | 8/1998 | Lott et al. |
| 5,806,886 A | 9/1998 | Ittel et al. |
| 6,251,200 B1 * | 6/2001 | Dunne ........................ 280/741 |

FOREIGN PATENT DOCUMENTS

| | | | |
|---|---|---|---|
| JP | 2-52037 | * | 2/1990 |
| JP | 9-39707 | * | 2/1997 |

OTHER PUBLICATIONS

A publication entitled "Getting Auto Exhausts to Pristine," *Chemical & Engineering News*, vol. 77, No. 04, Jan. 25, 1999.

* cited by examiner

*Primary Examiner*—Peter C. English
(74) *Attorney, Agent, or Firm*—Tarolli, Sundheim, Covell & Tummino L.L.P.

(57) ABSTRACT

An apparatus (10) for helping to protect a vehicle occupant includes an inflatable vehicle occupant protection device (16) and a inflator (12) for providing inflation fluid to inflate the vehicle occupant protection device (16). A non-azide gas generating material is in the inflator (12). The non-azide gas generating material when combusted produces inflation fluid which comprises carbon monoxide (CO) and nitrogen oxides ($NO_x$). A catalyst system which contacts the inflation fluid is also in the inflator. The catalyst system is reactive with the carbon monoxide (CO) and nitrogen oxides ($NO_x$) in the inflation fluid. The catalyst system comprises a zeolite and a catalytic material. The catalytic material is supported by the zeolite.

14 Claims, 1 Drawing Sheet

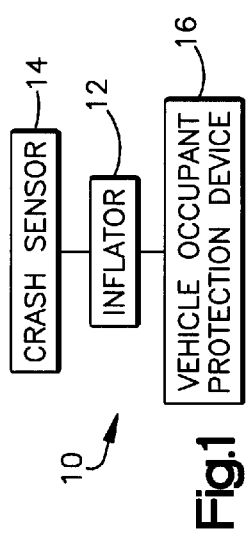
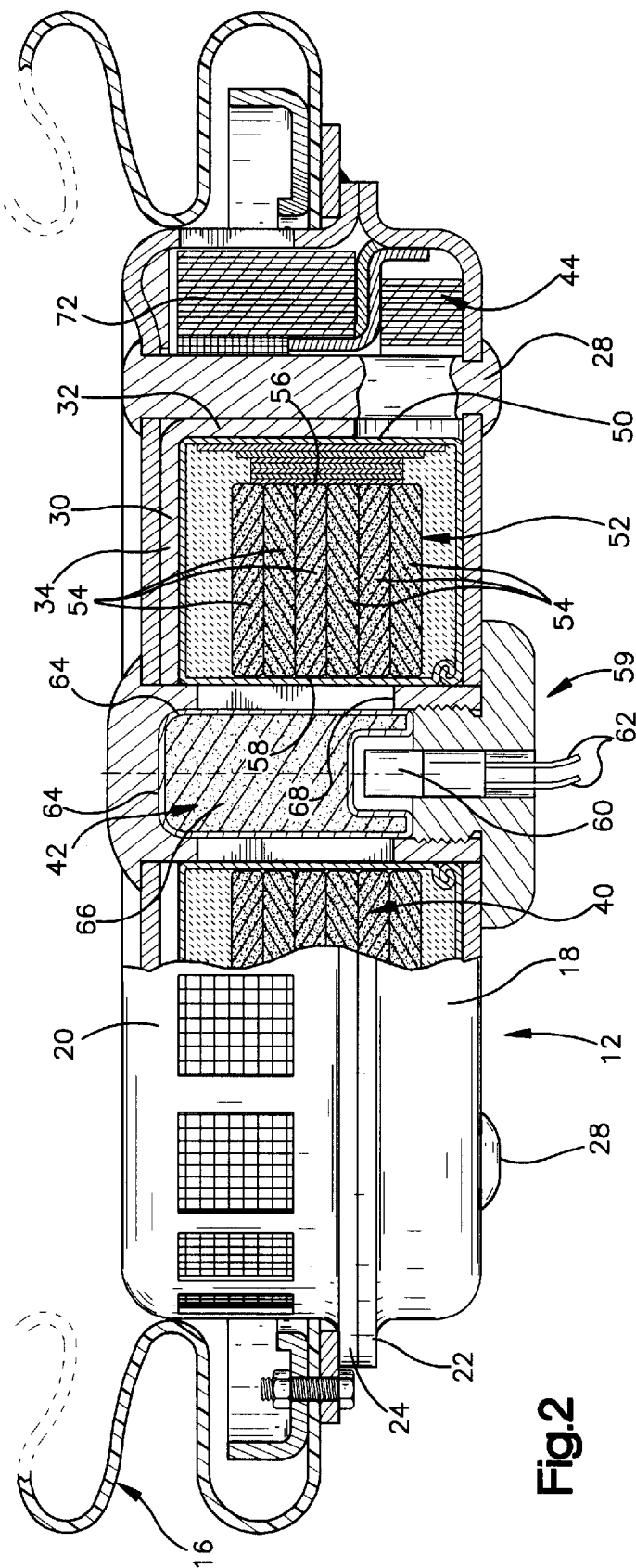

CATALYTIC FILTER FOR AN INFLATOR

The present application is a divisional application of U.S. patent application Ser. No. 09/911,202 filed Jul. 23, 2001, U.S. Pat. No. 6,481,747.

TECHNICAL FIELD

The present invention relates to an apparatus for helping to protect a vehicle occupant in the event of a vehicle collision, and particularly relates to an inflator for providing inflation fluid for inflating an inflatable vehicle occupant protection device.

BACKGROUND OF THE INVENTION

An inflator which provides inflation fluid to inflate an inflatable vehicle occupant protection device is known. In certain inflators the inflation fluid is generated by ignition of a gas generating material in the inflator.

Some gas generating materials are azide based while other gas generating materials are non-azide based. Non-azide based gas generating materials typically supply a higher yield of gas (moles of gas per gram of gas generant) than azide based gas generating materials.

However, non-azide based gas generating materials can produce inflation fluids with temperatures above 700° C. and with high levels of carbon monoxide (CO) and nitrogen oxides ($NO_x$). It is desirable to reduce the levels of carbon monoxide (CO) and nitrogen oxides ($NO_x$) to lower the concentration of carbon monoxide (CO) and nitrogen oxides ($NO_x$) in the inflation fluid produced by non-azide based gas generating materials before the inflation fluid flows into the air bag.

SUMMARY OF THE INVENTION

The present invention is an apparatus for helping to protect a vehicle occupant and includes an inflatable vehicle occupant protection device and an inflator for providing inflation fluid to inflate the vehicle occupant protection device. A non-azide gas generating material is in the inflator. The non-azide gas generating material when combusted produces inflation fluid that comprises carbon monoxide (CO) and nitrogen oxides ($NO_x$). A catalyst system which contacts the inflation fluid is also in the inflator. The catalyst system is reactive with the carbon monoxide (CO) and nitrogen oxides ($NO_x$) in the inflation fluid. The catalyst system comprises a zeolite and a catalytic material. The catalytic material is supported by the zeolite.

BRIEF DESCRIPTION OF THE DRAWINGS

The foregoing and other features of the invention will become more apparent to one skilled in the art upon consideration of the following description of the invention and the accompanying drawings in which:

FIG. 1 is a schematic view of a vehicle occupant protection apparatus embodying the present invention; and FIG. 2 is an enlarged, sectional view of a part of the apparatus of FIG. 1.

DESCRIPTION OF PREFERRED EMBODIMENTS

Referring to FIG. 1, a vehicle occupant protection apparatus 10 includes an inflatable vehicle occupant protection device 16. In the preferred embodiment of the present invention, the inflatable vehicle occupant protection device 16 is an air bag. The inflatable vehicle occupant protection device 16 could be any inflatable device, for example, an inflatable seat belt, an inflatable knee bolster, an inflatable head liner or side curtain, or a knee bolster operated by an air bag.

An inflator 12 is associated with the vehicle occupant protection device 16. The inflator 12 is actuatable to generate inflation fluid to inflate the inflatable vehicle occupant protection device 16.

The apparatus 10 also includes a crash sensor 14. The crash sensor 14 is a known device that senses a vehicle condition, such as vehicle deceleration, indicative of a collision. The crash sensor 14 measures the magnitude and duration of the deceleration. If the magnitude and duration of the deceleration meet predetermined threshold levels, the crash sensor 14 either transmits a signal or causes a signal to be transmitted to actuate the inflator 12. The inflatable vehicle occupant protection device 16 is then inflated and extends into the occupant compartment of the vehicle to help protect a vehicle occupant from a forceful impact with parts of the vehicle.

While the inflator 12 could be a hybrid inflator (not shown), in the preferred embodiment of the present invention, the inflator 12 is a pyrotechnic inflator. The specific structure of the inflator could vary. FIG. 2 illustrates by way of example the inflator 12.

Referring to FIG. 2, the inflator 12 comprises a base section 18 and a diffuser section 20. The two sections 18 and 20 are joined together at mounting flanges, 22 and 24, which are attached by means of a continuous weld. A plurality of rivets 28 also hold the diffuser section 20 and the base section 18 together.

A combustion cup 30 is seated between the diffuser section 20 and the base section 18. The combustion cup 30 comprises an outer cylindrical wall 32 and an annular top wall 34. The combustion cup 30 divides the inflator 12 into a combustion chamber 40, which is located within the combustion cup 30, and a filtration chamber 44, which is annular in shape and is located outside the combustion cup 30.

The combustion chamber 40 houses an inner container 50 which is hermetically sealed. The inner container 50 holds gas generating material 52 which is in the form of a plurality of gas generating disks 54.

The gas generating disks 54 have a generally toroidal configuration with a cylindrical exterior surface 56 and an axially extending hole defined by a cylindrical interior surface 58. The disks 54 are positioned in the container in a stacked relationship with the axially extending holes in alignment. The cylindrical interior surfaces 58 encircle an ignition chamber 42. Each disk 54 has generally flat opposed surfaces and may have protuberances on such surfaces to space one disk slightly from another. This configuration of the disks 54 promotes a uniform combustion of the disks 54. Other configurations of the gas generating material 52 can also be used.

The ignition chamber 42 is defined by a two-piece, tubular ignitor housing 59 that fits within the combustion cup 30 and the disks 54 and contains a squib 60. The squib 60 contains a small charge of ignitable material (not shown). Electric leads 62 convey a current to the squib 60. The current is provided when the crash sensor 14, which is responsive to a condition indicative of a vehicle collision, closes an electrical circuit that includes a power source (not shown). The current generates heat in the squib 60 which ignites the ignitable material. The ignition chamber 42 also has a canister 64 which contains a rapidly combustible pyrotechnic material 66 such as boron potassium nitrate. The rapidly combustible pyrotechnic material 66 is ignited by the small charge of ignitable material of the squib 60. The burning pyrotechnic material 66 exits from the ignition chamber 42 through openings 68 in the ignitor housing which lead to the combustion chamber 40. The burning pyrotechnic material 66 penetrates the container 50 and ignites the gas generating disks 54. Other ignition systems capable of igniting the disks 54 are well known and can be used with the present invention.

The gas generating material 52 of which the disks 54 are formed is a non-azide gas generating material. Non-azide gas generating materials have combustion temperatures of at least about 1000° C. and produce inflation fluids with temperatures of at least about 700° C. The inflation fluid produced upon combustion of non-azide gas generating materials includes carbon monoxide (CO) and nitrogen oxides ($NO_x$).

The vehicle occupant protection apparatus 10 also comprises a catalytic filter 72 in the filtration chamber 44. The catalytic filter 72 is in the flow path between the combustion chamber 40 and the vehicle occupant protection device 16. The catalytic filter 72 catalytically converts carbon monoxide (CO) and nitrogen oxides ($NO_x$), which are in the inflation fluid produced upon combustion of the non-azide gas generating material, to nitrogen ($N_2$) and carbon dioxide ($CO_2$). The catalytic filter 72 also cools the inflation fluid.

The catalytic filter 72 preferably comprises a substrate which has been coated with a particulate catalyst system. The catalyst system catalytically converts carbon monoxide (CO) and nitrogen oxides ($NO_x$) in the inflation fluid to carbon dioxide ($CO_2$) and nitrogen ($N_2$). The catalyst system comprises a microporous zeolite and a catalytic material. The catalytic material is supported by the zeolite.

Zeolites are microporous, crystalline solids with high surface areas. Zeoltes have high specific heats and are thermally stable up to about 500° C. Zeolites are formed from naturally hydrated silicates of aluminum and either sodium or calcium, or both. Zeolites have a three-dimensional aluminum silicate crystal framework with pores or openings in the crystal framework. The pores of a zeolite are highly regular and of precise diameter, typically from about 1 angstrom to about 10 angstroms. The highly regular and precise pores of zeolites, allow zeolites to capture (i.e. adsorb) molecules with greater selectivity than do other solids with irregular pore sizes and high surface areas, such as silica gel or activated carbon.

Preferred zeolites for use in the present invention include zeolites with pore sizes from about 3 angstroms to about 8 angstroms. Zeolites with pores sizes between about 3 angstroms and 8 angstroms include molecualar sieve A, molecular sieve beta, molecular sieve X, chabazite, mordenite, and ZSM-5. Preferably, the zeolite is ZSM-5. ZSM-5 has the formula $Na_3[(AlO_2)_3(SiO_2)] \cdot xH_2O$ and is commercially available from Zeolyst International in Valley Forge, Pa. It is moderately hyrophilic and has an average pore size from about 4 angstroms to about 5 angstroms.

The zeolite of the present invention provides high surface area reaction sites for the catalytic conversion of the carbon monoxide (CO) and nitrogen oxides ($NO_x$) in the inflation fluid. Preferably, the zeolite has a surface area of at least about 10 $m^2/g$ and more preferably a surface area of at least about 30 $m^2/g$. When the surface area is less than about 10 $m^2/g$, the catalytic material may not be dispersed sufficiently throughout the zeolite and the catalyst system may fail to catalytically convert the carbon monoxide (CO) and nitrogen oxides ($NO_x$), in the inflation fluid to nitrogen ($N_2$) and carbon dioxide ($CO_2$).

Moreover, the zeolite facilitates interaction of the carbon monoxide (CO) and nitrogen oxides ($NO_x$) with the catalytic material. This is accomplished by the adsorption of only carbon monoxide (CO) and nitrogen oxides ($NO_x$) of the inflation fluid.

The catalytic material of the present invention, which is supported by the zeolite, lowers the energies of activation for the catalytic conversions of carbon monoxide (CO) and nitrogen oxides ($NO_x$) to carbon dioxide (CO) and nitrogen ($N_2$). Preferred catalytic materials for the present invention include catalytic materials which are capable of lowering the energy of activation for oxidation of carbon monoxide (CO), and capable of lowering the energy of activation for reduction of nitrogen oxides ($NO_x$). Examples of catalytic materials useful in the present invention are a transition metal such as copper, iron, cerium, platinum, vanadium, zinc, zirconium, barium, lanthanum, manganese, nickel, molybdenum, rhodium, or palladium; an oxide of a transition metal such as copper, iron, cerium, platinum, vanadium, zinc, zirconium, barium, lanthanum, manganese, nickel, molybdenum, rhodium, or palladium; an active metal such as sodium or potassium; acidic or basic compounds or ions such as $H^+$, amines, or ammonium; and a mixture of transition metals, active metals, and acidic or basic compounds. The metal catalytic materials can be in their normal metal form or ionic form.

The catalytic material is supported by the zeolite by introducing the catalytic material into the pores of the zeolite. The catalytic material may be introduced into the pores of the zeolite by known methods such as wash coating, impregnation, precipitation, and ion-exchange. Preferably, the catalytic material is introduced into the pores of the zeolite by impregnation methods.

Once introduced into the pores of the zeolite, the catalytic material and the zeolite are calcined at temperatures between about 400° C. and 500° C. Calcining the zeolite and catalytic material removes impurities from the catalyst system and activates the catalyst system.

The catalyst system can be either bonded to the substrate by known wash coating methods or adhesive means, or formed itself into a filter structure without a substrate by mechanically compacting the materials of the catalyst system.

The shape and size of the substrate is dependent upon its location in the filter chamber 44. The substrate can be a three-dimensional structure such as a monolith or a plurality of bodies such as beads or pellets. When the substrate is in the form of beads or pellets, the beads or pellets are porous bodies of suitable size and number to place an aggregate surface area of the beads or pellets in contact with the inflation fluid. When the substrate is in the form of a monolith, the monolith is a porous, honeycomb shaped body with parallel channels running in the direction of the flow of the inflation fluid.

When the catalyst system is coated on the substrate, the material used to form the substrate preferably has a high thermal conductivity and a high specific heat in order to provide sufficient cooling of the inflation fluid. The material for the substrate preferably has a high strength to resist crushing forces produced by high velocity fluid flow of inflation fluid through the catalytic filter 72. It is also desirable that the material have a high surface to volume ratio to provide suitable sites for adhering the catalyst system to the substrate.

Preferred materials for forming the substrate include porous heat resistant ceramics such as γ-alumina, titania, zirconia, and their composite oxides such as γ-alumina-titania, γ-alumina-silica, γ-alumina-zirconia, cordierite, mullite, and oxide mixtures containing γ-alumina. Also, the substrate may be formed from a known metal material. Preferably, the substrate is formed from cordierite, mullite, γ-alumina, and oxide mixtures containing γ-alumina.

Inflation fluid produced upon combustion of the non-azide gas generating material flows through the catalytic filter 72 to the vehicle occupant protection device 16. As the inflation fluid flows through the catalytic filter 72 the inflation fluid contacts the catalyst system. The catalyst system, in combination with heat from the inflation fluid produced by the combustion of the non-azide gas generating material catalytically converts carbon monoxide (CO) and nitrogen oxides ($NO_x$) in the inflation fluid to carbon dioxide ($CO_2$) and nitrogen ($N_2$). The following oxidation and reduction reactions are examples of catalytic reactions taking place in the present invention:

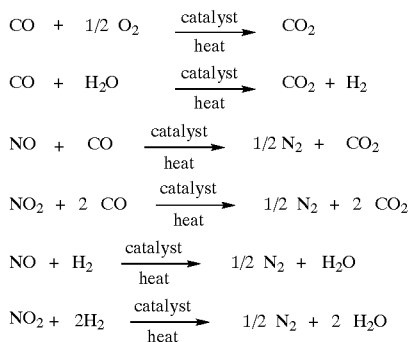

Some of the catalyst system melts as a result of the high temperature (i.e. at least about 700° C.) of inflation fluid produced upon combustion of the non-azide gas generating material. Zeolites melt at about 500° C. The amount of catalyst system in the inflator is greater than the amount of catalyst system that melts during combustion of the gas generating material. This loss of catalyst system is acceptable because additional catalyst system remains which is effective to catalytically convert remaining carbon monoxide (CO) and nitrogen oxides ($NO_x$) in the inflation fluid. Moreover, zeolites have a high specific heat and readily absorb heat from the inflation fluid a during melting of the catalyst system. Thus, melting of the catalyst system is an important factor in lowering the temperature of the inflation fluid.

EXAMPLE

A commercially available acidic zeolite powder (ZSM-5, marketed by Zeolyst International of Valley Forge, Pa., having a surface area of 230 m²/g and pore size of 4–5 angstroms) was immersed in an aqueous solution of ammonium nitrate ($NH_4^+NO_3^-$). The acidic zeolite powder ($H^+Z^-$) formed a soluble salt with the ammonium nitrate ($NH_4^+NO_3^-$). The solution of ammonium zeolite salt ($NH_4^+Z^-$) was basic. Sodium chloride ($Na^+Cl^-$) was added to the aqueous solution of ammonium zeolite salt ($NH_4^+Z^-$). The ammonium zeolite salt ($NH_4^+Z^-$) was transformed by ion-exchange to a zeolite supporting a sodium ion. The pH of the solution was lowered until the zeolite supporting the sodium ion precipitated out of solution. The zeolite supporting the sodium ion was removed from the solution by vacuum filtration and dried at a temperature of about 110° C. The dried zeolite supporting the sodium ion was then calcined at a temperature of about 450° C. to remove trace decomposable salts. The catalyst system of zeolite supporting the sodium ion was ground and then adhered to a preformed cordierite substrate to form a catytic filter.

The catalytic filter was tested in a pyrotechnic, passenger side inflator with a non-azide organic propellant. The catalytic filter lowered the levels of gasses in the inflation fluid by the following weight percentages:

| Gas | Wt. % |
| --- | --- |
| CO | 24 |
| NO | 53 |
| $NO_2$ | 73 |

Advantages of the present invention should now be apparent. The present invention takes advantage of favorable catalytic characteristics of using a catalyst system which comprises a zeolite and a catalytic material in a catalytic filter for an inflator. The catalyst system catalytically converts carbon monoxide (CO) and nitrogen oxides ($NO_x$) in the inflation fluid to nitrogen ($N_2$) and carbon dioxide ($CO_2$). Moreover, the catalyst system of the present invention upon melting lowers the temperature of the inflation fluid.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect a vehicle occupant, said apparatus comprising:
an inflator for providing inflation fluid to inflate said vehicle occupant protection device;
a non-azide gas generating material in said inflator which when combusted produces inflation fluid comprising carbon monoxide (CO) and nitrogen oxides ($NO_x$); and
a catalyst system in said inflator which contacts said inflation fluid, said catalyst system being reactive with the carbon monoxide (CO) and nitrogen oxides ($NO_x$) in the inflation fluid, said catalyst system comprising a zeolite and a catalytic material, said catalytic material being supported by said zeolite.

2. The apparatus of claim 1 wherein the inflation fluid has a temperature of at least about 200° C. above the melting temperature of said zeolite, the amount of said catalyst system being greater than the amount melted during combustion of the gas generating material.

3. The apparatus as defined in claim 1 wherein the catalyst system is a composition capable of catalytically converting the carbon monoxide (CO) and nitrogen oxides ($NO_x$) in the inflation fluid to carbon dioxide ($CO_2$) and nitrogen ($N_2$).

4. The apparatus as defined in claim 3 wherein the catalytic material is a compound or ion capable of lowering the energy of activation for oxidation of the carbon monoxide (CO) and the energy of activation for reduction of the nitrogen oxides ($NO_x$).

5. The apparatus as defined in claim 4 wherein the catalytic material is selected from the group consisting of transition metals, oxides of transition metals, active metals, acidic ions, basic ions, and mixtures thereof.

6. The apparatus as defined in claim 5 wherein the catalytic material is selected from the group consisting of copper, oxides of copper, iron, oxides of iron, cerium, oxides of cerium, platinum, oxides of platinum, vanadium, oxides of vanadium, zinc, oxides of zinc, zirconium, oxides of zirconium, barium, oxides of barium, lanthanum, oxides of lanthanum, manganese, oxides of manganese, nickel, oxides of nickel, molybdenum, oxides of molybdenum, rhodium, oxides of rhodium, palladium, oxides of palladium, sodium, potassium, $H^+$, ammonium, and mixtures thereof.

7. The apparatus of claim 1 wherein said zeolite has a pore diameter from about 3 angstroms to about 8 angstroms.

8. The apparatus as defined in claim 7 wherein said zeolite has a surface area of at least about 10 $m^2/g$.

9. The apparatus as defined in claim 8 wherein said zeolite is selected from the group consisting of ZSM-5, molecular sieve A, molecular sieve beta, molecular sieve X, chabazite, and mordenite.

10. The apparatus as defined in claim 9 wherein said zeolite is ZSM-5.

11. The apparatus as defined in claim 1 further comprising a substrate, said catalyst system being bonded to said substrate.

12. The apparatus as defined in claim 11 wherein said substrate is selected from the group consisting of ceramic beads, ceramic pellets, and a ceramic monolith.

13. An apparatus for inflating an inflatable vehicle occupant protection device, said apparatus comprising:

an inflation fluid source which, when actuated, produces inflation fluid, said inflation fluid being at a temperature of at least about 700° C. and comprising carbon monoxide (CO) and nitrogen oxides ($NO_x$); and a catalyst system which contacts said inflation fluid comprising a zeolite and a catalytic material, said catalytic material being supported by said zeolite, said catalyst system being reactive with the carbon monoxide (CO) and nitrogen oxides ($NO_x$) in the inflation fluid.

14. The apparatus as defined in claim 13 wherein said inflation fluid source is a non-azide gas generating material.

* * * * *

UNITED STATES PATENT AND TRADEMARK OFFICE
CERTIFICATE OF CORRECTION

PATENT NO. : 6,581,963 B2
DATED : June 24, 2003
INVENTOR(S) : Michael G. Mangum

It is certified that error appears in the above-identified patent and that said Letters Patent is hereby corrected as shown below:

<u>Column 6,</u>
Line 36, after "comprising:" insert a new paragraph -- an inflatable vehicle occupant device; --.

Signed and Sealed this

Sixth Day of July, 2004

JON W. DUDAS
*Acting Director of the United States Patent and Trademark Office*